March 24, 1970
L. J. MALTBY
3,502,102
FLOW OPERATED SHUTOFF VALVE
Filed July 26, 1967
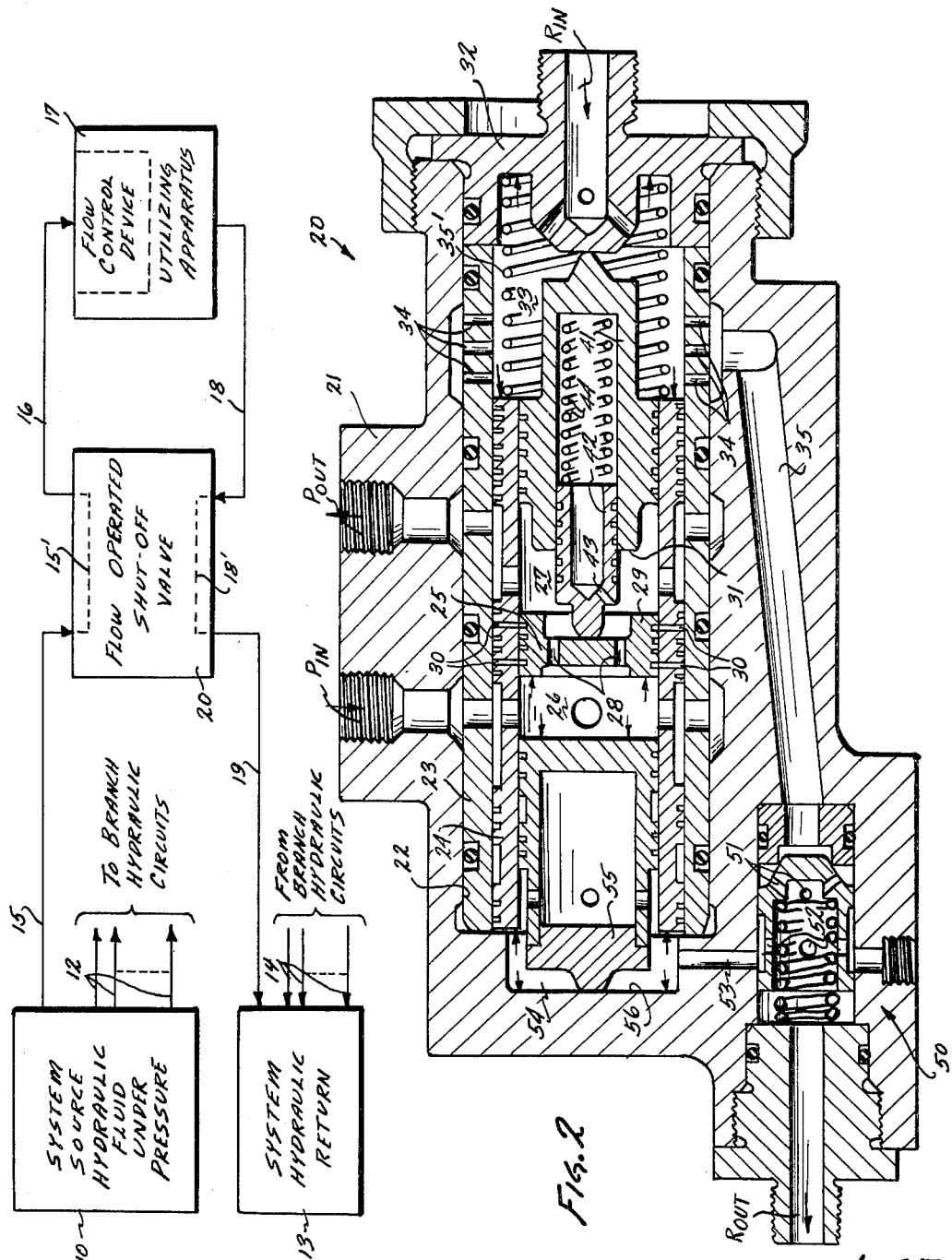
INVENTOR
LEWIS J. MALTBY
Nilsson, Robbins
BY Anderson ATTORNEYS

United States Patent Office 3,502,102
Patented Mar. 24, 1970

3,502,102
FLOW OPERATED SHUTOFF VALVE
Lewis J. Maltby, Burbank, Calif., assignor to Bell Aerospace Corporation, a corporation of Delaware
Filed July 26, 1967, Ser. No. 656,194
Int. Cl. F16k *31/36, 15/02*
U.S. Cl. 137—498
9 Claims

ABSTRACT OF THE DISCLOSURE

There is disclosed a valve mechanism which is adapted to be placed in the hydraulic system branch line extending between a source of hydraulic fluid under pressure and a utilizing apparatus such as an hydraulic actuator. The valve compares the flow of hydraulic fluid from the source to the actuator with the flow of hydraulic fluid from the actuator to the system return. If a leak develops in the branch line downstream of the valve so as to create an imbalance in the flow patterns, the valve translates to a closed position thus shutting off flow, thereby to prevent leakage of hydraulic fluid from the source thereof. Also included as a part of the valve mechanism is a damper device which prevents transient flow surges from inadvertently actuating the valve. A check valve is housed internally of the valve structure to isolate system return from the apparatus return in the event of a leak occurring in the apparatus return line, and system return pressure is ported to and actuates the valve when the check valve is closed even though there is no flow of hydraulic fluid through the valve.

BACKGROUND OF THE INVENTION

In the prior art it has long been desirable to provide apparatus whereby loss of hydraulic fluid can be prevented in the event a rupture or leak occurs in a branch circuit which is included as a part of the overall system. If such leakage cannot be precluded, then substantially the entire source of hydraulic fluid can be dissipated through the rupture or leak, thus rendering the entire hydraulic system inoperable. In the prior art there have been provided fuse type hydraulic shutoff valves which are operable only in the event that the amount of flow of hydraulic fluid exceeds a certain predetermined design value. It has been found that small leaks can occur which are below this predetermined value and which actually permit the hydraulic fluid to be lost from the system without causing the shutoff valve to actuate. As a result thereof, the fuse type shutoff valves have limited applications. Furthermore, such fuse type valves are generally not capable of detecting transient flow surges as distinguished from a rupture in the branch line and therefore operate to shutoff flow to a part of an apparatus when such is not required.

SUMMARY OF THE INVENTION

Accordingly, it is an object of the present invention to provide a shutoff valve for automatically eliminating hydraulic fluid loss from a source of hydraulic fluid in the event of a leak occurring in the downstream side of said valve.

It is another object of the present invention to provide a valve for automatically eliminating hydraulic fluid loss from a source thereof in the event of a leak occurring which valve is sensitive only to flow of hydraulic fluid and is insensitive to pressure changes in the fluid source or the return yet which under no flow conditions will actuate in the event of a leak occurring in the branch return line.

It is a further object of the present invention to provide a flow operated shutoff valve which is not responsive to transient flow surges which may occur in the system source or return circuits.

It is yet another object of the present invention to provide a flow operated shutoff valve which independently detects leakage in the pressure or return sides of a utilizing device and shuts off flow of hydraulic fluid from the system source thereof.

It is still another object of the present invention to provide a flow operated shutoff valve which compares the flow of hydraulic fluid to a utilizing apparatus with the flow of hydrualic fluid from the utilizing apparatus and operates to shut off such flow only when the ratio of the flow to and from the apparatus exceeds a predetermined amount.

BRIEF DESCRIPTION OF THE DRAWING

Additional objects and advantages of the present invention will become apparent from a consideration of the following description taken in conjunction with the accompanying drawing in which:

FIGURE 1 is a block diagram representation of a hydraulic system incorporating a flow operated shutoff valve as a part thereof; and FIGURE 2 is a cross-sectional view of a preferred form of a flow operated shutoff valve constructed in accordance with the present invention.

DESCRIPTION OF THE PREFFERED EMBODIMENT

The flow operated shutoff valve constructed in accordance with the present invention includes a valve body having a control spool slidably positioned therein. A first flow path is defined through the valve and internally through the control spool for receiving the flow path of the fluid from the source thereof under pressure (the pressure flow path). Disposed within the first flow path is a pressure flow control orifice defining means which during flow of fluid produces a pressure drop thereacross and a resultant force tending to move the control spool into such a position as to shut off flow of fluid from the source thereof. The valve also includes a second flow path which receives fluid as it returns from the utilizing apparatus (the return flow path). The second flow path includes return flow control orifice defining means which also creates a pressure drop thereacross which produces a force that is applied to the control spool in a direction opposite to the pressure flow control orifice generated force. So long as these two forces (the pressure force as compared to the return force) are substantially equal, the control spool is precluded from blocking the flow of fluid from the source thereof. However, should the flow ratio exceed a certain predetermined amount, the control spool is actuated to close the flow path from the pressure source to the utilizing apparatus.

Referring now to the drawing and more particularly to FIGURE 1 thereof, a system utilizing the shutoff valve in accordance with the present invention is schematically illustrated. As is therein shown, a source 10 of system hydraulic fluid under pressure is connected by a plurality of branch lines 12 into a plurality of branch hydraulic circuits. The branch hydraulic circuits are returned to the system hydraulic return 13 through a plurality of return lines 14.

A typical interconnection of a branch circuit using a shutoff valve in accordance with the present invention is shown through the connection of a branch line 15 between the system source 10 and a flow operated shutoff valve 20. As is illustrated by the dashed line 15' hydraulic fluid flows through the shutoff valve 20 and to a line 16 which interconnects the shutoff valve to the utilizing apparatus 17. As illustrated, the utilizing apparatus 17 may include a flow control device if such is desired in the particular application. Such a device may take any form desired such as, for example only, an electrohydraulic servo valve as shown in Patent 2,947,286, or a solenoid operated valve of the type as shown in Patent 2,853,976 or the like.

The return flow of the hydraulic fluid from the utilizing apparatus passes through the line 18 and into the flow operated shutoff valve 20 and, as shown by the dashed line 18', the flow passes through the shutoff valve into a line 19 which is connected back to the system hydraulic return 13. The flow operated shutoff valve 20 actuates to stop flow from the source 10 in the event the flow of fluid to the apparatus 17 (pressure flow) becomes excessive when compared to the flow of fluid from the apparatus 17 (return flow). That is, the ratio of the pressure flow of the return flow cannot exceed a certain predetermined value without causing the shutoff valve 20 to actuate. Therefore, in the event of a leak occurring in lines 16 or 18 or in the utilizing apparatus 17, the shutoff valve 20 actuates to prevent the loss of fluid from the system source thereof.

Referring now to FIGURE 2, a preferred form of a flow operated shutoff valve in accordance with the present invention is illustrated. As is therein shown, a body 21 defines a main bore 22 therein. A sleeve 23 is positioned within the bore 22 while a control spool 24 is slidably positioned within the sleeve 23. The control spool 24 includes a pressure flow control orifice defining means such as a divider wall 25 which is affixed to spool 24 as by pins 30 and which divides the hollow portion of the control spool into an upstream pressure flow chamber 26 and a downstream pressure flow chamber 27. The wall 25 defines pressure flow control orifices 28 therein. The wall 25 also defines a poppet type valve surface 29 positioned within the downstream chamber 27 which cooperates with a valve seat 31 to stop the flow of hydraulic fluid from the pressure source, in the event of a leak on the downstream side of the valve. Thus the valve defines a first fluid flow path from the pressure source through the valve from the port marked $P_{in}$ through the upstream chamber 26, the orifices 28, the downstream chamber 27 and out through the port marked $P_{out}$ to the utilizing apparatus. As the fluid flows through the orifices 28, a pressure drop occurs thereacross thus creating a force in the upstream chamber 26 which acts against the surface of the wall 25 exposed to the upstream chamber 26, as shown by the arrows in the chamber 26, thus causing the control spool 24 to be moved toward the right as viewed in FIGURE 2, so as to attempt to bring the poppet valve 29 into contact with the valve seat 31 to block the first flow control path.

An end cap 32 positioned and retained over the end of the main bore 22 defines a port marked $R_{in}$ which receives return flow from the utilizing apparatus and directs the same into a return flow chamber 33 which is peripherally defined by the inner surface of the sleeve 23. The sleeve 23 also defines a plurality of return flow control orifices 34 which orifices in turn communicate with a passageway 35 which exits from the valve body 21 at a port marked $R_{out}$ after first passing through a check valve 50. As return fluid flows from the utilizing apparatus and through the orifices 34 a pressure drop occurs thereacross thus creating a force within the return flow chamber 33 which acts upon the end surface of the control spool as shown by the arrows in the return flow chamber 33. This force tends to balance the forces created by the drop across the pressure flow control orifices 28 thus causing the control spool to assume a position, under normal operating conditions, such that flow occurs from the source of fluid under pressure back to the system return without interference. To accomplish the required force balance, the spool valve moves toward the right as viewed in FIGURE 2 and closes or partially closes part of the return flow control orifices 34 until the pressure drop thereacross is sufficient to produce a force acting on the end edge of the spool valve in chamber 33 to accomplish the desired normal operation balance. However, should a rupture occur in the line 16 which carries the fluid under pressure to the utilizing apparatus 17 (see FIGURE 1), an increase flow demand from the source of fluid under pressure is created. Under these circumstances the forces produced in the upstream pressure flow chamber 26 as a result of the pressure drop across the orifices 28 exceeds any balance obtainable by the forces generated from the pressure drop across the return flow control orifices. Therefore, the control spool 24 is translated to the right, as viewed in FIGURE 2, until the poppet valve 29 is firmly seated against the valve seat 31 thus shutting off the flow of fluid from the source. Since there is no further fluid flow through the utilizing apparatus, the fluid pressure maintained in the upstream chamber 26 is sufficient to keep the valve in such closed position.

Also, should the line 18 through which the return fluid from the utilizing apparatus 17 flows develop a rupture the pressure drop across the orifices 34 is reduced since there is less flow therethrough and again the forces produced in the chamber 26 exceed any balance obtainable by those produced in the chamber 33 and the control spool 24 again is translated toward the right to cut off fluid flow.

A damper designed to preclude transient flow surges from operating the valve is shown in FIGURE 2 and includes a first piston means slidably mounted to move along the internal surface of the control spool 24. This piston 41 normally abuts the end cap 32 as illustrated to firmly hold the valve seat 31 in place during the time the shutoff valve is in its shutoff position. As is illustrated the piston means 41 is hollow and has a second piston means 42 slidably positioned therein. The second piston means 42 defines an orifice 43 therein. A spring means 44 is positioned within the hollow piston means 41 and urges the two piston means 41 and 42 apart continuously. In normal operation a quantity of hydraulic fluid is held within the cavity defined by the two hollow piston means 41 and 42. The oil passes through the orifice 43 until this cavity is filled. Under these conditions if a flow surge occurs in the system pressure lines which would tend to move the control spool 24 toward the right, the fluid within the cavity must first be expelled through the orifice 43. Such expulsion must take place over a controlled period of time thus precluding instantaneous transfer of the control spool 24. Thus in the event of flow surges, the spool would not translate a distance sufficient to close the valve.

Under some operating circumstances wherein there is no flow from the source of fluid under pressure to the utilizing apparatus and a rupture occurs in a return line, the fluid in the branch circuit can escape through the rupture. To preclude such an occurrence in accordance with a valve of the present invention, a check valve 50 is inserted within the shutoff valve body 21 and is designed to permit flow through the passageway 35 and through the orifices 51 outward through the port marked $R_{out}$ to system return. Additional orifices 52 are provided in the body of the check valve 50 and communicate with a passageway 53 into a chamber 54. Positioned within the chamber 54 is an isolating spool 55 which abuts the end wall 56 of the main bore 22. Pressure within the upstream pressure flow chamber 26 normally maintains the isolating spool 55 in the position illustrated in FIGURE 2. Under normal operating conditions, the return fluid from the downstream side of the return flow control orifices 34 is present within the chamber 54 and creates a force acting against the end area of the control spool 24 as shown by the arrows. This force, however, is small compared to the forces created within the return flow chamber 33.

However, should, under no flow conditions where there is no pressure drop across the orifices 28 and thus no forces produced within the upstream chamber 26, a break occur in the return line, the control spool 24 will be caused to translate to close the valve and such translation will occur in the following manner: The system return is normally at a pressure greater than atmospheric. Upon the occurrence of the rupture in the return line 18 the return portion of the utilizing apparatus will be at atmospheric pressure. Under these circumstances, the check valve 50 will close, thus subjecting the chamber 54 to system return pressure. The system return pressure acts against the end of the control spool 24 as indicated by the arrows in the champer 54 with a force sufficient to overcome the force of the spring 35' positioned in the return flow chamber and thereby causes the flow control valve to close as above indicated. By such action therefore, the pressure flow path is interrupted even though there is no flow therethrough at the time the return line develops the leak.

Various portions of the detailed structure of the apparatus illustrated in FIGURE 2 have not been described since such would be obvious to one skilled in the art. For example, various seals between the sleeve 23 and the bore 22, the flow ports defined by the sleeve 23 and the spool 24, the various lap fits between the spool 24, the sleeve 23, the isolating spool 55 and the control spool 24, and the respective surfaces of the pistons 41 and 42 as shown.

There has thus been disclosed a flow operated shutoff valve which automatically compares the pressure flow and the return flow respectively to and from a utilizing apparatus and when the same exceeds a predetermined ratio, the valve translates to preclude loss of hydraulic fluid from the system source therefor.

What is claimed is:

1. A flow operated shutoff valve for inclusion in a fluid flow containing means between a source of fluid under pressure having a system return and apparatus utilizing said fluid to isolate said source from any fluid leakage downstream of said valve, said valve comprising:
   (1) a control spool slidably disposed within a bore defining fluid pressure and fluid return flow ports;
   (2) a first flow path through said valve for receiving fluid from said source thereof, said first path including a passageway internally through said spool, said first path further including first flow responsive means in said passageway for producing forces proportional to fluid flow to said apparatus tending to move said spool in a first direction;
   (3) a second flow path through said valve for receiving return fluid from said utilizing apparatus, second flow responsive means in said second flow path for producing forces proportional to fluid flow from said apparatus tending to move said spool in the opposite direction;
   (4) said first and second flow paths being isolated; said control spool being slidable, responsive to a force differential between the forces produced by said first and second responsive means of a predetermined amount, to block flow through said flow ports.

2. A shutoff valve as defined in claim 1 which further includes second slidably disposed spool means continuously vented to system return and check valve means disposed between said system return and the fluid flow from said apparatus and arranged to preclude fluid flow from said system return, whereby upon closing of said check valve said control spool tends to move to block said flow ports.

3. A shutoff valve as defined in claim 1 which further includes damper means responsive to transient flow surges emanating from said source or said return to preclude operation of said valve as a result of said surges.

4. A shutoff valve as defined in claim 3 wherein said damper means includes a first piston means slidably disposed in said control spool and exposed only to return flow, a second piston slidably disposed in said first piston and exposed only to pressure flow, and spring means urging said first and second piston means apart.

5. A shutoff valve as defined in claim 4 wherein said piston means are each hollow cylinders with one closed end, said second piston means being slidably disposed in said first piston means and forming an enclosed chamber filled with fluid under quiescent conditions, one of said piston means defining an orifice through which fluid in said chamber is expelled upon transient flow surges being applied to said damper means.

6. A shutofl valve as defined in claim 1 wherein said first flow responsive means is a wall member positioned in said first flow path and defining a plurality of openings therethrough.

7. A shutoff valve as defined in claim 6 wherein said control spool is a hollow member and said wall member is fixedly disposed therein to define within said control valve upstream and downstream pressure flow chambers.

8. A shutoff valve as defined in claim 1 wherein said second flow responsive means is a wall member positioned in said second flow path and defining a plurailty of openings therethrough.

9. A shutoff valve as defined in claim 8 wherein said control spool is disposed within a sleeve and said sleeve defines said wall member poistioned in said second flow path.

References Cited

UNITED STATES PATENTS

| 2,478,210 | 8/1949 | Sprague et al. | 137—498 XR |
| 2,478,211 | 8/1949 | Sprague et al. | 137—498 XR |
| 2,853,976 | 9/1958 | Gerwig et al. | 137—625.64 |
| 2,947,286 | 8/1960 | Baltus et al. | 91—365 |

M. CARY NELSON, Primary Examiner

ROBERT J. MILLER, Assistant Examiner

U.S. Cl. X.R.

251—16